(12) United States Patent
Jimenez Perez Mitre et al.

(10) Patent No.: US 9,476,462 B2
(45) Date of Patent: Oct. 25, 2016

(54) CLUTCH WITH WIRE PIVOT RING HAVING STRAIGHT SECTIONS

(71) Applicant: Schaeffler Technologies AG & Co. KG, Herzogenaurach (DE)

(72) Inventors: Alfredo Jimenez Perez Mitre, Wooster, OH (US); David Smith, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 50 days.

(21) Appl. No.: 14/641,581

(22) Filed: Mar. 9, 2015

(65) Prior Publication Data

US 2015/0308514 A1 Oct. 29, 2015

Related U.S. Application Data

(60) Provisional application No. 61/983,199, filed on Apr. 23, 2014.

(51) Int. Cl.

| F16D 23/12 | (2006.01) |
|---|---|
| F16D 13/42 | (2006.01) |
| F16D 13/58 | (2006.01) |
| F16D 21/06 | (2006.01) |
| F16D 13/70 | (2006.01) |

(52) U.S. Cl.
CPC ............... *F16D 23/12* (2013.01); *F16D 13/42* (2013.01); *F16D 13/58* (2013.01); *F16D 13/585* (2013.01); *F16D 13/70* (2013.01); *F16D 21/06* (2013.01); *F16D 2021/0607* (2013.01); *F16D 2021/0669* (2013.01)

(58) Field of Classification Search
CPC ...... F16D 13/42; F16D 13/585; F16D 13/58; F16D 23/12; F16D 2021/0607
See application file for complete search history.

(56) References Cited

U.S. PATENT DOCUMENTS

| 3,361,239 A | 1/1968 | Binder | |
|---|---|---|---|
| 4,184,578 A * | 1/1980 | Moore | F16D 13/585 192/89.23 |
| 4,633,989 A | 1/1987 | Yoneda | |
| 5,181,594 A | 1/1993 | Nash | |
| 5,845,750 A * | 12/1998 | Thirion De Briel | F16D 13/757 188/196 V |
| 6,957,729 B2 * | 10/2005 | Osman | F16D 13/757 192/111.2 |
| 2012/0067687 A1 | 3/2012 | Hodge et al. | |

FOREIGN PATENT DOCUMENTS

| DE | 102013204437 | 10/2013 |
|---|---|---|
| DE | 102013211448 | 1/2014 |
| DE | 102013221836 | 5/2014 |

* cited by examiner

*Primary Examiner* — Jacob S Scott
*Assistant Examiner* — Tinh Dang
(74) *Attorney, Agent, or Firm* — Simpson & Simpson, PLLC

(57) ABSTRACT

A pivot ring for a clutch includes a central axis; a plurality of circumferentially curved portions; a plurality of engagement portions, each engagement portion circumferentially disposed between respective first and second circumferentially curved portions from the plurality of circumferentially curved portions and including: an alignment portion; a first and second stiffened attachment portions extending in lines from the alignment portion to the adjacent curved portions; and, first and second circumferential distal ends. Each engagement portion is arranged to receive a respective lever for the clutch; and, the first and second distal ends are arranged to fixedly connect to the clutch. Also presented is a clutch assembly including: an axis of rotation; a pressure plate having opposing first and second surfaces; a plurality of levers, and the pivot ring. Each lever is pivotably connected to a respective engagement portion, such that the plurality of levers is displaceable to close the clutch.

20 Claims, 7 Drawing Sheets

CLUTCH WITH WIRE PIVOT RING HAVING STRAIGHT SECTIONS

CROSS-REFERENCE TO RELATED APPLICATIONS

This application claims the benefit under 35 U.S.C. §119 (e) of U.S. Provisional Patent Application No. 61/983,199, filed Apr. 23, 2014, which application is incorporated herein by reference in its entirety.

TECHNICAL FIELD

The present disclosure pertains to the field of friction clutches, especially friction clutches for vehicles, more particularly to clutches having pivotable components, and more particularly to clutches utilizing pivot rings as a fulcrum for the pivotable components.

BACKGROUND

Pivot rings are utilized in clutches to provide a fulcrum around which a diaphragm spring, lever, or similar component may rotate. When a clutch is activated, these components pivot about the pivot ring. Due to the curved shape of the pivot ring a contact area between the component and the ring is limited. During the pivoting of the component about the pivot ring, the lever ratio changes due to the circumferential shifting of the contact point between the component and the wire pivot ring. Shifting the contact point between the pivot ring and a surface of the spring, lever, or other component not only affects the lever ratio, but also creates undesirably high contact forces, friction, and heat at the pivot point, increasing wear on the components and the ring.

SUMMARY

According to aspects illustrated herein, there is provided a clutch, including: an axis of rotation; a pressure plate; a plurality of levers; and a pivot ring including a plurality of circumferentially curved portions, and a plurality of engagement portions. Each engagement portion is: arranged to receive a respective lever for the clutch; and circumferentially disposed between respective first and second circumferentially curved portions from the plurality of circumferentially curved portions. Each engagement portion includes: an alignment portion; a first stiffened attachment portion extending in a first straight line from the alignment portion to the first circumferentially curved portion; and a second stiffened attachment portion extending in a second straight line from the alignment portion to the second circumferentially curved portion. The pivot ring includes first and second circumferential distal ends fixedly secured to the pressure plate.

According to aspects illustrated herein, there is provided a clutch including: an axis of rotation; a pressure plate; a pivot ring; and a plurality of levers displaceable to close the clutch. The pressure plate includes a plurality of protrusions and a respective groove in each protrusion. The pivot ring includes: a plurality of circumferentially curved portions; a plurality of engagement portions, each engagement portion at least partially disposed in a respective groove, circumferentially disposed between respective first and second circumferentially curved portions from the plurality of circumferentially curved portions, and including an alignment portion, a first stiffened attachment portion extending in a first straight line from the alignment portion to the first circumferentially curved portion, and a second stiffened attachment portion extending in a second straight line from the alignment portion to the second circumferentially curved portion. The pivot ring includes first and second circumferential distal ends fixed to the pressure plate. Each lever is pivotably connected to a respective engagement portion.

According to aspects illustrated herein, there is provided a clutch assembly, including: an axis of rotation; a pressure plate including a plurality of protrusions with respective grooves; a pivot ring fixedly connected to the pressure plate; and a plurality of levers. The pivot ring includes: a plurality of circumferentially curved portions; a plurality of engagement portions; and, first and second circumferential distal ends fixed to the pressure plate. Each engagement portion: is circumferentially disposed between respective first and second circumferentially curved portions from the plurality of circumferentially curved portions and includes: an alignment portion disposed in a respective groove; a first attachment portion extending in a first straight line from the alignment portion to the first circumferentially curved portion and including a first surface having a first shape; and a second attachment portion extending in a second straight line from the alignment portion to the second circumferentially curved portion and including a second surface having the first shape. Each lever includes third and fourth surfaces having the first shape and engaged with the first and second surfaces, respectively. The plurality of levers are pivotable about the plurality of engagement portions to close the clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
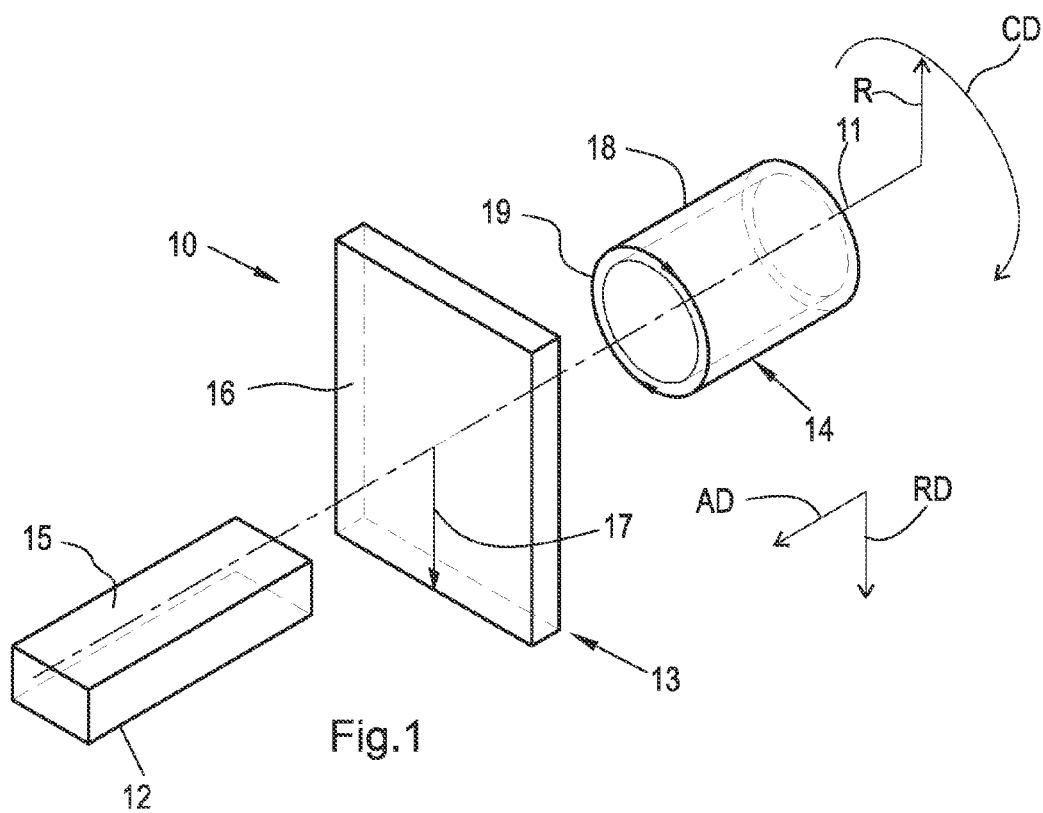
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
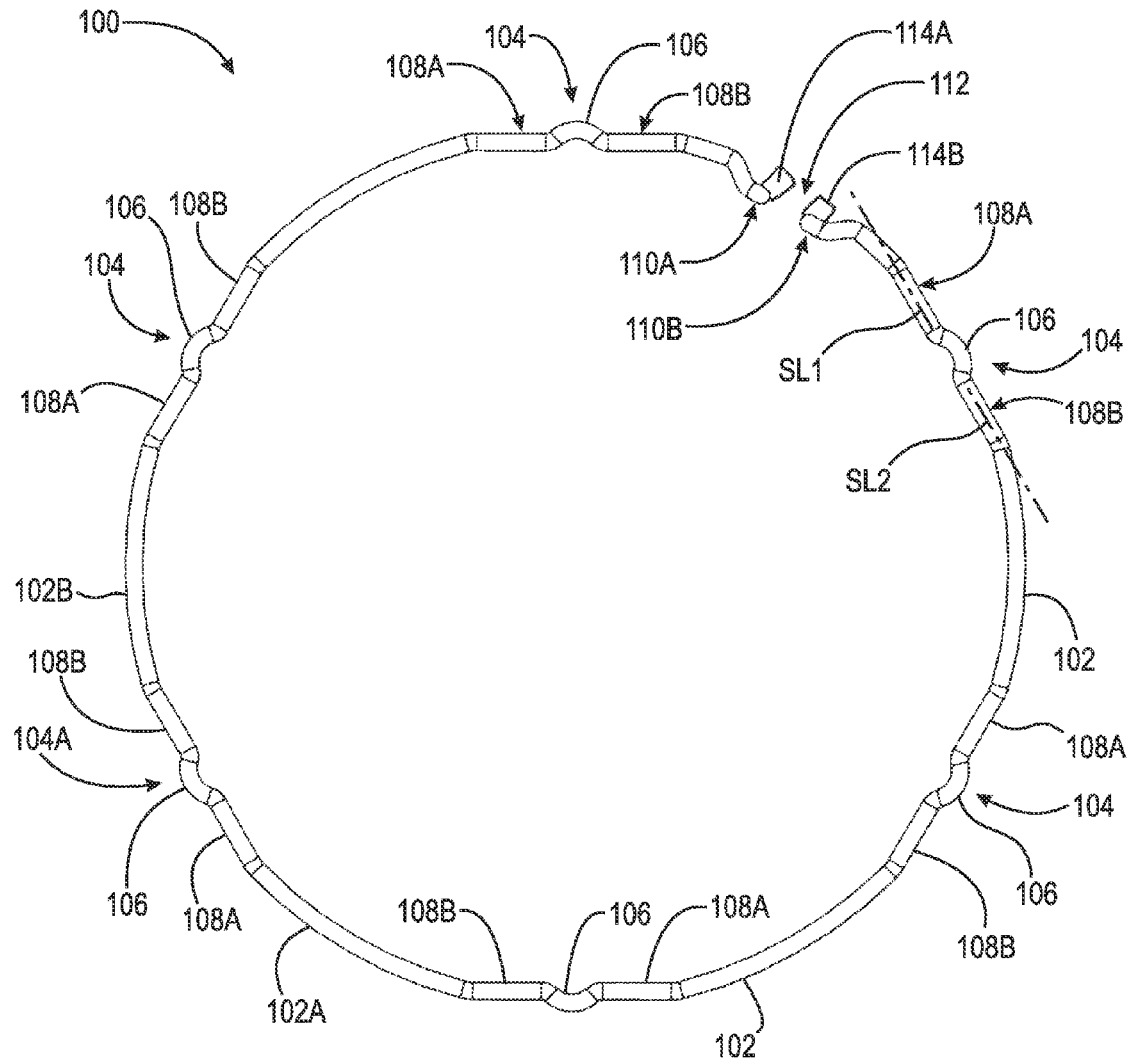
FIG. 2 is a top plan view of a wire pivot ring for a clutch.

FIG. 2 is a top plan view of wire pivot ring 100 for a clutch.

Figure 3:
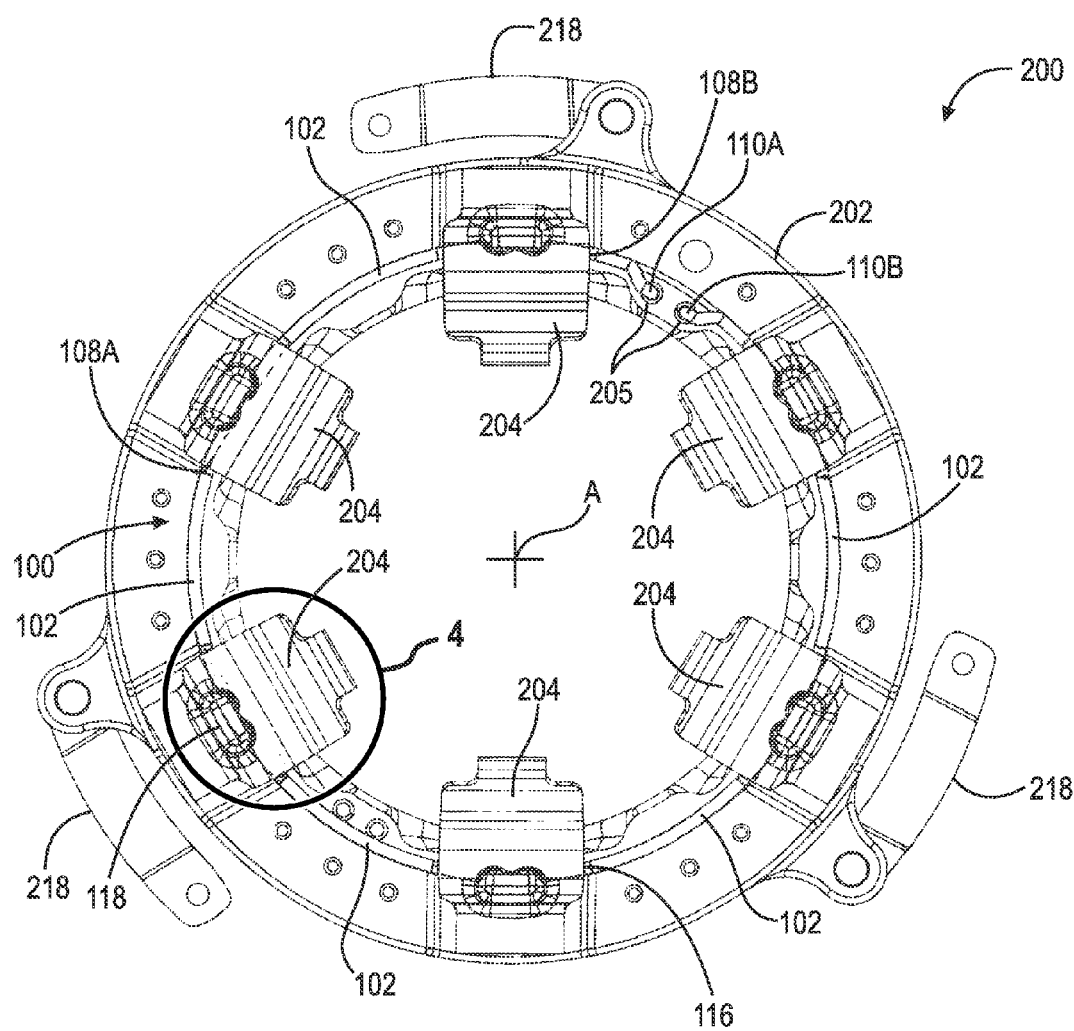
FIG. 3 is a back view of a portion of a clutch including the wire pivot ring shown in FIG. 2.

FIG. 3 is a back view of a portion of clutch 200 including wire pivot ring 100 shown in FIG. 2.

Figure 4:
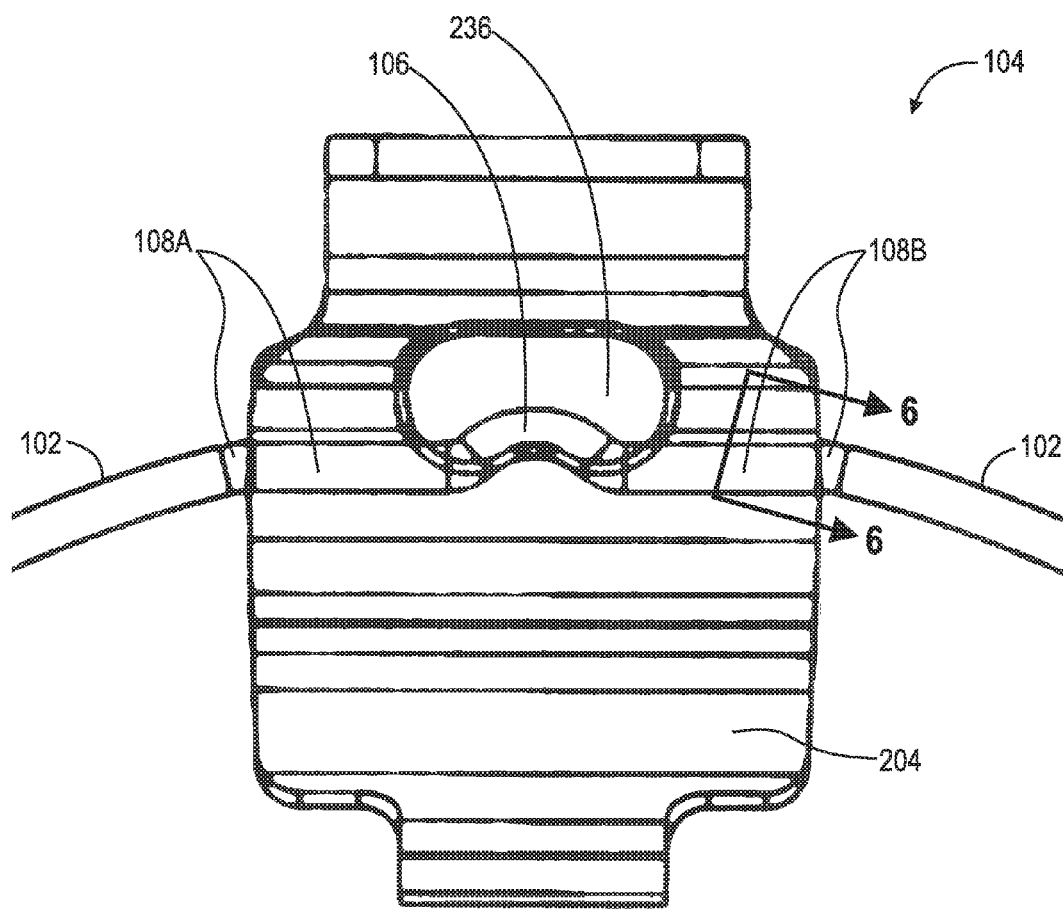
FIG. 4 is a close up view of the circled area 4 in FIG. 3.

FIG. 4 is a close up view of the circled area 4 in FIG. 3.

Figure 5:
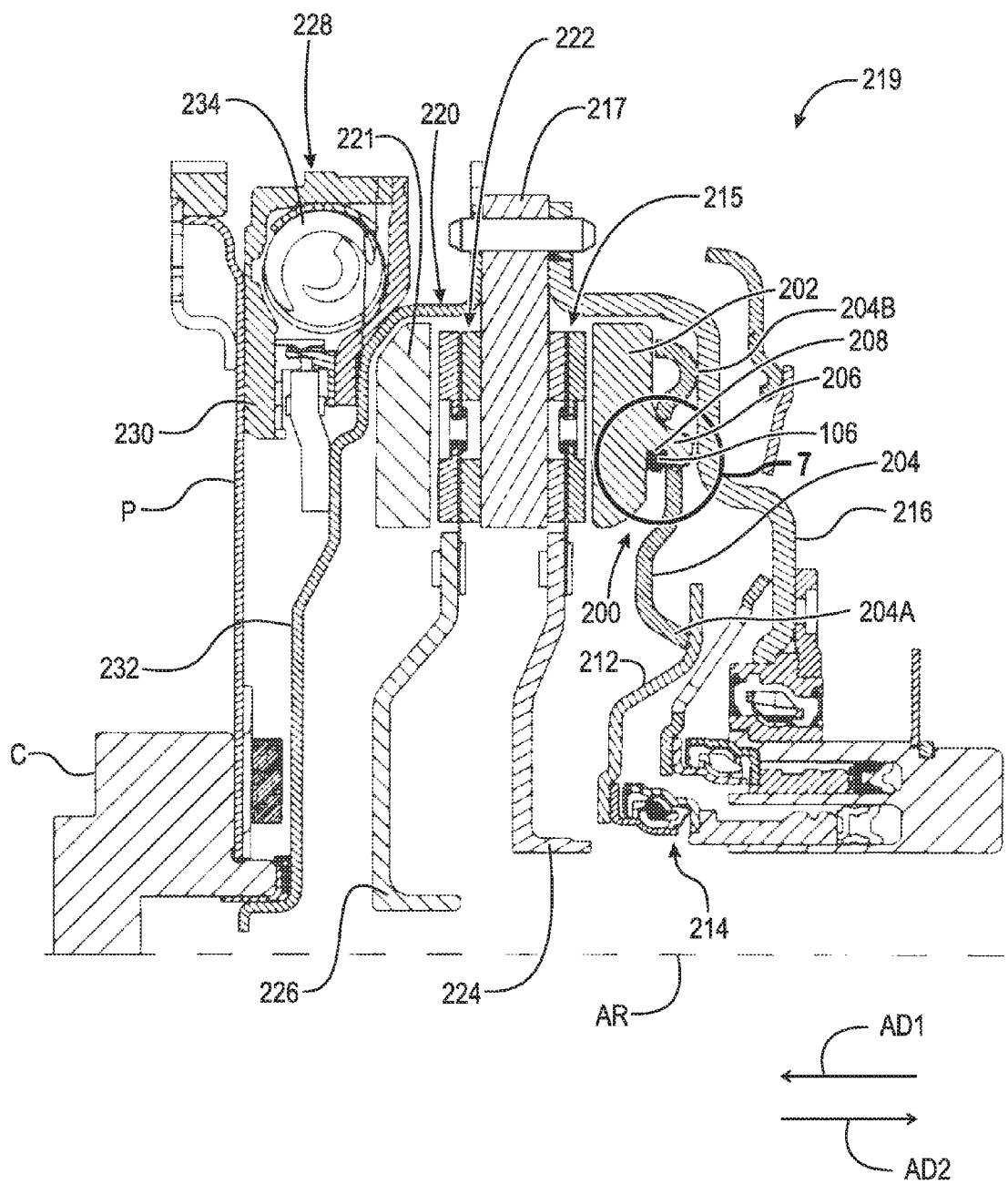
FIG. 5 is a cross section view of a clutch assembly including the clutch and wire pivot ring shown in FIGS. 2 and 3.

FIG. 5 is a cross section view of a clutch assembly including clutch 200 and wire pivot ring 100 shown in FIG. 2. The following should be viewed in light of FIGS. 2 through 5. In the discussion that follows, pivot ring 100 is described in the context of clutch 200. Pivot ring 100 includes circumferentially curved portions 102 and engagement portions 104. Each engagement portion is circumferentially disposed between respective circumferentially curved portions 102. For example, engagement portion 104A is circumferentially disposed between portions 102A and 102B. Each engagement portion 104 includes: alignment portion 106 and stiffened attachment portions 108A and 108B. Portion 108A extends in straight line SL1 from the alignment portion to a circumferentially curved portion 102. Portion 108B extends in straight line SL2 from the alignment portion to a circumferentially curved portion 102. For example, for portion 104A, portions 108A and 108B extend to portions 102A and 102B, respectively. Ring 100 includes distal ends 110A and 110B flanking gap 112. In an example embodiment, stiffened attachment portions 108A and 108B are round or curved in a radial cross-section. In an example embodiment, alignment portion 106 extends radially outward from attachment portions 108A and 108B.

Clutch 200 includes pressure plate 202 and levers 204. Each engagement portion 104 is arranged to receive a respective lever 204. In an example embodiment, each alignment portion 104 is arranged to circumferentially retain a respective lever 204. Distal ends 110A and 110B are arranged to fixedly connect to pressure plate 202. In an example embodiment, distal ends 110A and 110B includes anti-rotation component 114A and 114B, respectively, fixedly secured to pressure plate 202. In an example embodiment, pressure plate 202 includes holes 205 and anti-rotation components 114A and 114B are at least partially disposed in holes 205.

Pressure plate 202 includes protrusions 206. Each protrusion 206 includes a groove 208. Each portion 104 is disposed in a respective groove 208. In an example embodiment, portions 106 are fixedly secured to plate 202 within grooves 208.

Figure 6:
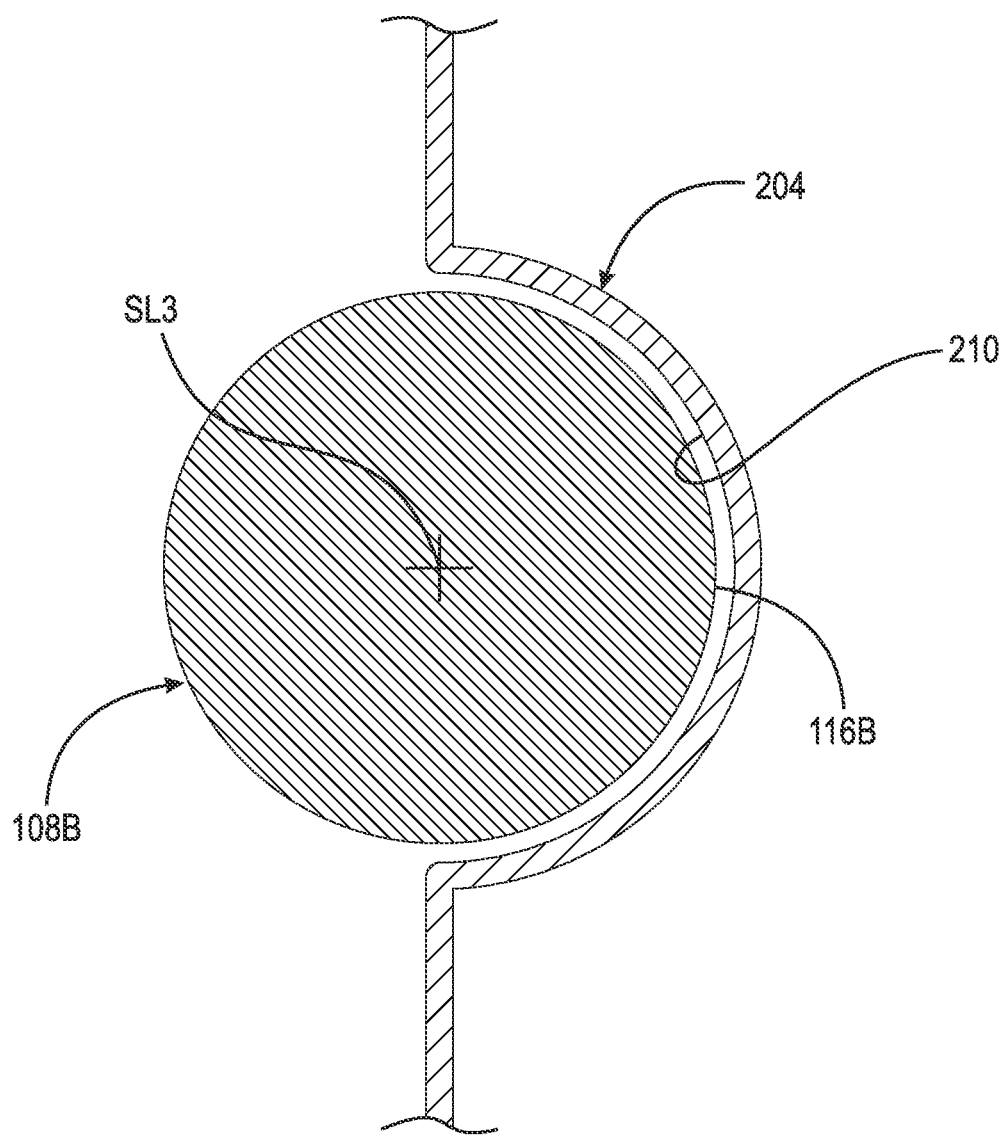
FIG. 6 is a cross-sectional view generally along line 6-6 in FIG. 4; and, FIG. 7 is enlarged cross section view of circled area 7 of FIG. 5 showing the alignment guide held in place by a protrusion of pressure plate of the clutch.
Figure 7:
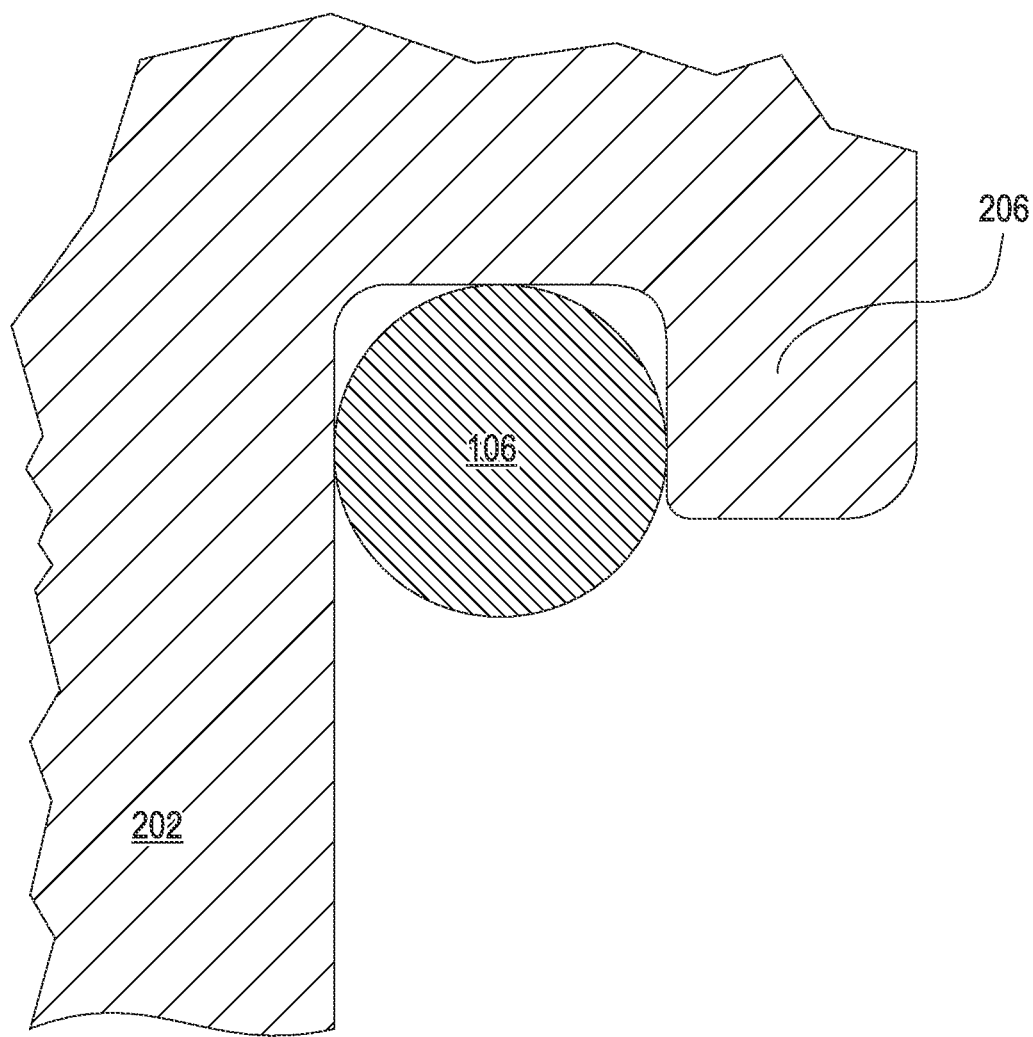

FIG. 6 is a cross-sectional view generally along line 6-6 in FIG. 4. Portions 108A and 108B includes surfaces 116A and 116B, respectively, in contact with surfaces 210 of levers 204 (in FIG. 6 a gap is shown between surfaces to help distinguish between the surfaces). In an example embodiment, surfaces 116A, 116B, and 210 all have a same shape in a radial cross-section, for example, the circular or partial circular shape shown in FIG. 6. In an example embodiment, for each portion 104, straight line SL3 is co-linear with straight lines SL1 and SL2 and a respective lever 204 pivots about line SL3 to open and close clutch.

Clutch 200 includes at least one shim, or washer, 212 (the discussion that follows is directed to a single shim 212), actuator 214, and at least one clutch plate 215, for example, plate(s) 215 includes or is made of friction material. Shim 212 is engaged with levers 204, for example, at ends 204A, and actuator 214 is arranged to displace in axial direction AD1 to displace shim 212 in direction AD1. As ends 204A are displaced in direction AD1, levers 204 pivot about ring 100, in particular, about portions 108A and 108B.

The pivoting of levers 204 cause ends 204B to contact cover 216. Ends 204B react against cover 216, pushing the portion of the lever engaged with ring 100 in direction AD1, which in turn pushes pressure plate 202 in direction AD1. Thus, pressure plate 202 closes clutch 200, non-rotatably connecting pressure plate 202, clutch plate(s) 215, and backing plate 217, which is non-rotatably connected to cover 216.

In an example embodiment, pressure plate 202 is attached to cover 216 with leaf springs 218. Springs 218 urge pressure plate 202 in axial direction AD2 to open clutch 200. In an example embodiment, clutch 200 is part of clutch assembly 219 which includes clutch 220 with pressure plate 221 and at least one clutch plate 222, for example, plate(s) 222 includes or is made of friction material. In an example embodiment, clutch plates 215 and 221 are non-rotatably connected to hubs 224 and 226 respectively. For example, hubs 224 and 226 are arranged to non-rotatably connect to respective input shafts (not shown). In an example embodiment, assembly 219 includes torsional vibration damper 228 including input part 230, output part 232 non-rotatably connected to cover 216, and at least one spring 234. Parts 230 and 232 are engaged with the at least one spring 234.

Part 230 is non-rotatably connected to plate P, which is arranged to non-rotatably connect to, for example, crankshaft C.

In an example embodiment, lever 204 includes opening 236 wholly surrounded by material forming the lever. At least a portion of a respective protrusion 206 is located in each opening 236. Thus, openings 236 enable levers 204 to pivot about ring 100 while ring 100 is fixed to pressure plate 202 at protrusions 206.

Advantageously, engagement portions 104, and in particular, stiffened attachment portions 108A and 108B, enable a constant lever ratio as levers 204 pivot about portions 108A and 108B to engage clutch 200. Specifically, rather than pivoting about a known circumferentially curved pivot ring as described above, levers 204 rotate about straight portions of ring 100 intersected by line SL3.

Thus, all of surface 210 is in contact with surfaces 116A and 116B throughout the entire pivoting range of lever 204 and the radial effect associated with known curved pivot rings is eliminated. As a result, the contact area between levers 204 and portions 104 remains constant and contact pressure between levers 204 and ring 100 is evenly distributed. Thus, the undesirably high contact forces, friction, and heat at the pivot point, noted above, and the subsequent increase in wear on levers 204 and ring 100 is eliminated.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A clutch, comprising:
an axis of rotation;
a pressure plate;
a plurality of levers; and,
a pivot ring including:
a plurality of circumferentially curved portions;
a plurality of engagement portions, each engagement portion:
arranged to receive a respective lever for the clutch; and,
circumferentially disposed between respective first and second circumferentially curved portions from the plurality of circumferentially curved portions and including:
an alignment portion;
a first stiffened attachment portion extending in a first straight line from the alignment portion to the first circumferentially curved portion; and,
a second stiffened attachment portion extending in a second straight line from the alignment portion to the second circumferentially curved portion; and,
first and second circumferential distal ends fixedly secured to the pressure plate.

2. The clutch of claim 1, wherein each of said alignment portions is arranged to circumferentially retain the respective lever.

3. The clutch of claim 1, wherein the first and second attachment portions are round or curved in a radial cross-section.

4. The clutch of claim 1, wherein a respective third straight lines is co-linear with the respective first and second straight lines.

5. The clutch of claim 1 wherein:
the respective lever includes a respective opening wholly surrounded by material forming said each lever;
the pressure plate includes a plurality of protrusions; and,
at least a portion of a respective protrusion is located in the respective opening.

6. The clutch of claim 1 further comprising:
at least one first shim engaged with the plurality of levers; and,
an actuator arranged to axially displace the at least one first shim to pivot the plurality of levers about the pivot ring to close the clutch.

7. The clutch of claim 1 further comprising:
a cover, wherein a radially outer portions of said each lever is arranged to contact the cover when said each lever pivots about the pivot ring to close the clutch.

8. A clutch, comprising:
an axis of rotation;
a pressure plate including:
a plurality of protrusions; and,
a respective groove in each protrusion;
a pivot ring including:
a plurality of circumferentially curved portions;
a plurality of engagement portions, each engagement portion:
at least partially disposed in a respective groove;
circumferentially disposed between respective first and second circumferentially curved portions from the plurality of circumferentially curved portions; and,
including:
an alignment portion;
a first stiffened attachment portion extending in a first straight line from the alignment portion to the first circumferentially curved portion; and,
a second stiffened attachment portion extending in a second straight line from the alignment portion to the second circumferentially curved portion; and,
first and second circumferential distal ends fixed to the pressure plate; and,
a plurality of levers displaceable to close the clutch, each lever pivotably connected to a respective engagement portion.

9. The clutch of claim 8, wherein said each alignment portion is fixedly connected to the pressure plate at the respective groove.

10. The clutch assembly of claim 8, wherein:
said each lever includes a respective opening wholly surrounded by material forming said each lever; and,
at least a portion of a respective protrusion is located in the respective opening.

11. The clutch of claim 8, wherein:
each first and second stiffened attachment portion includes first and second circumferential surfaces, respectively, having a first shape in a radial cross-section; and,
said each lever includes first and second surfaces in contact with the first and second circumferential surfaces, respectively, and having the first shape in a radial cross-section.

12. The clutch of claim 8 wherein:
for said each engagement portion, a respective straight line passes through the first and second stiffened attachment portions; and,
said each lever pivots about said respective straight line.

13. The clutch of claim 8 wherein:
said each lever includes a respective opening wholly surrounded by material forming said each lever;
the pressure includes a plurality of protrusion; and,
at least a portion of a respective protrusion is located in the respective opening.

14. The clutch of claim 8 further comprising:
at least one first shim engaged with the plurality of levers;
an actuator arranged to axially displace the at least one first shim to pivot the plurality of levers about the pivot ring to close the clutch; and,
a cover, wherein a radially outer portions of said each lever is arranged to contact the cover when said each lever pivots about the pivot ring to close the clutch.

15. A clutch assembly, comprising:
an axis of rotation; and,
a first clutch including:
    a first pressure plate including a plurality of protrusions with respective grooves;
    a pivot ring fixedly connected to the pressure plate and including:
        a plurality of circumferentially curved portions;
        a plurality of engagement portions, each engagement portion:
            circumferentially disposed between respective first and second circumferentially curved portions from the plurality of circumferentially curved portions; and,
            including:
                an alignment portion disposed in a respective groove;
                a first attachment portion extending in a first straight line from the alignment portion to the first circumferentially curved portion and including a first surface having a first shape; and,
                a second attachment portion extending in a second straight line from the alignment portion to the second circumferentially curved portion and including a second surface having the first shape; and,
        first and second circumferential distal ends fixed to the pressure plate; and,
    a plurality of levers, each lever including third and fourth surfaces having the first shape and engaged with the first and second surfaces, respectively, wherein:
the plurality of levers are pivotable about the plurality of engagement portions to close the clutch.

16. The clutch assembly of claim 15 wherein:
for said each engagement portion, a respective straight line passes through the first and second attachment portions; and,
said each lever is pivotable about said respective straight line.

17. The clutch assembly of claim 15 wherein:
said each lever includes a respective opening wholly surrounded by material forming said each lever; and,
at least a portion of a respective protrusion is located in the respective opening.

18. The clutch assembly of claim 15 further comprising:
at least one first shim engaged with the plurality of levers; and,
an actuator arranged to axially displace the at least one first shim to pivot the plurality of levers about the pivot ring to close the clutch.

19. The clutch assembly of claim 18 further comprising:
a cover, wherein a radially outer portions of said each lever is arranged to contact the cover when said each lever pivots about the pivot ring to close the clutch.

20. The clutch assembly of claim 15 further comprising:
a second clutch including a second pressure plate.

* * * * *